US008386259B2

(12) United States Patent
Lortz (10) Patent No.: US 8,386,259 B2
(45) Date of Patent: Feb. 26, 2013

(54) VOICE INTERFACE TO NFC APPLICATIONS

(75) Inventor: Victor B. Lortz, Beaverton, OR (US)

(73) Assignee: Intel Corporation, santa Clara, CA (US)

( * ) Notice: Subject to any disclaimer, the term of this patent is extended or adjusted under 35 U.S.C. 154(b) by 887 days.

(21) Appl. No.: 11/647,001

(22) Filed: Dec. 28, 2006

(65) Prior Publication Data

US 2008/0162141 A1    Jul. 3, 2008

(51) Int. Cl.
*G10L 11/00* (2006.01)
*G10L 21/00* (2006.01)

(52) U.S. Cl. ............... 704/270.1; 704/270; 704/275; 379/900; 379/907; 379/910; 455/563

(58) Field of Classification Search ........ 704/270, 704/270.1, 275; 379/900, 907, 910; 455/563
See application file for complete search history.

(56) References Cited

U.S. PATENT DOCUMENTS

| | | | | |
|---|---|---|---|---|
| 5,915,001 | A * | 6/1999 | Uppaluru | 379/88.22 |
| 6,732,078 | B1 * | 5/2004 | Luomi et al. | 704/270.1 |
| 7,409,229 | B2 * | 8/2008 | Choi | 455/563 |
| 7,669,149 | B2 * | 2/2010 | Dietl et al. | 715/865 |
| 7,818,178 | B2 * | 10/2010 | Overend et al. | 704/270.1 |
| 2003/0095525 | A1 | 5/2003 | Lavin et al. | |
| 2004/0138781 | A1 * | 7/2004 | Sacks et al. | 700/245 |
| 2009/0075592 | A1 * | 3/2009 | Nystrom et al. | 455/41.1 |

FOREIGN PATENT DOCUMENTS

| | | |
|---|---|---|
| CN | 1578513 A | 2/2005 |
| EP | 1 206 103 A2 | 5/2002 |
| EP | 1496678 A2 | 1/2005 |
| JP | 11-184670 A | 7/1999 |
| JP | 2001-273226 A | 10/2001 |
| JP | 2002-183693 A | 6/2002 |
| JP | 2003-036403 A | 2/2003 |
| JP | 2003-198451 A | 7/2003 |

(Continued)

OTHER PUBLICATIONS

Want, R. "An Introduction to RFID Technology" Persuasive Computing IEEE vol. 5 Issue 1. Jan.-Mar. 2006 IEEE.*

(Continued)

*Primary Examiner* — Talivaldis Ivars Smits
*Assistant Examiner* — Shaun Roberts
(74) *Attorney, Agent, or Firm* — Barnes & Thornburg LLP (57) ABSTRACT

A method for combining speech recognition with near field communication (NFC) to enable a user to enter, store, and use web addresses on portable devices. A user of a portable device having a NFC reader, a voice input interface, a speech recognition system, and memory enables the NFC reader of the portable device to touch a NFC tag or reader found on an object. The object containing information of interest to a user of the portable device; wherein when the NFC reader and the NFC tag or reader touch, the portable device receives a URI and default keywords associated with the URI. The portable device stores the URI in a persistent storage of the portable device based on the default keywords, and date, time, and location of when and where the URI was obtained. The user of the portable device can then retrieve and use the URI at a later time using the voice input interface and the speech recognition system, wherein when the user speaks the default keywords into the voice input interface, the speech recognition system to retrieve the URI.

21 Claims, 5 Drawing Sheets

FOREIGN PATENT DOCUMENTS

| | | |
|---|---|---|
| JP | 2005-004782 A | 6/2005 |
| WO | 2006/002308 A2 | 1/2006 |
| WO | 2006/070278 A1 | 7/2006 |

OTHER PUBLICATIONS

Smart Poster Record Type Definition, Technical Specification, NFC Forum, SPR 1.1, NFCForum-SmartPoster_RTD_1.0, Jul. 24, 2006.
Text Record Type Definition, Technical Specification, NFC Forum, RTD-TEXT 1.0, NFCForum-TS-RTD_Text_1.0, Jul. 24, 2006.
URI Record Type Definition, Technical Specification, NFC Forum, RTD-URI 1.0, NFCForum-TS-RTD_URI_1.0, Jul. 24, 2006.
NFC Data Exchange Format (NDEF), Technical Specification, NFC Forum, NDEF 1.0, NFCForum-TS-NDEF_1.0, Jul. 24, 2006.
NFC Record Type Definition(RTD), Technical Specification, NFC Forum, RTD 1.0, NFCForum-TS-RTD_1.0, Jul. 24, 2006.
Koninklijke Philips Electronics N.V.,Come closer,go further,2004-2006, http://www.usa.philips.com/mt_theme_2006_07_nfc_large.html.
Office Action Received for Chinese Patent Application No. 200710306289.X, mailed on Sep. 18, 2009, 7 Pages of Chinese Office Action, and 6 Pages of English Translation.
Office Action for Japenese Patent Application No. 2007-332573, mailed on Jul. 27, 2010, 2 Pages of Japenese Office Action, and 2 Pages of English Translation.
Extended European search report from EP 07254998.3-2413 dated Aug. 6, 2010, 7 pages.
Office Action for Chinese Patent Application No. 200710306289, mailed on Jul. 5, 2011, 7 pages of Office action and 7 pages of English Translation (unofficial).
Extended European Search Report for European Patent App. No. 12001475.8, mailed Jul. 20, 2012, 4 pages.
Office Action for Chinese Patent Application No. 200710306289.X, mailed Apr. 16, 2012, 2 pages of unofficial English summary translation and 3 pages of Chinese Office Action.

* cited by examiner

VOICE INTERFACE TO NFC APPLICATIONS

BACKGROUND OF THE INVENTION

1. Field of the Invention

The present invention is generally related to near field communications (NFC). More particularly, the present invention is related to a voice interface to NFC applications.

2. Description

Near-Field Communications (NFC) is a very short-range contactless data transfer technology related to RFID (Radio Frequency Identification). NFC has achieved commercial success in Europe and Japan for public transit payment systems and for point-of-sale purchases using cell phones with built-in NFC interfaces.

Another NFC application that has been proposed and deployed to a limited extent is to store URIs (Universal Resource Identifiers) in NFC tags attached to Smart Posters. Users with NFC-equipped cell phones can scan the NFC tag on a Smart Poster to automatically call up web content associated with the poster on their cell phones. This eliminates the need to manually enter a URI on a device with a limited keypad. However, Smart Poster scenarios typically presume that the user intends to immediately use the URI. What is not considered is the problem of retrieving or managing multiple such URIs on the portable device.

Speech recognition is another possible technology that could be used for entering web addresses on limited user interface devices. However, considering how awkward it is to verbally communicate most URIs to another person, it is clear that speech recognition technology will have to become very sophisticated before it can be used for this purpose. Accurate speech recognition requires a large number of MIPS (million instructions per second), which is problematic for low power portable devices. Furthermore, even if the recognition engine worked perfectly, insurmountable usability obstacles surround the problem of verbally entering typical URIs such as, for example, http://www!ncbi!nlm!nih!gov/entrez/query!fcqi?cmd=Retrieve&db=PubMed&list_uids=99 62543&dopt=Abstract. (It should be noted that periods have been replaced with exclamation marks in the above referenced URI to avoid inadvertent hyperlinks.)

Thus, what is needed is a technique for combining speech recognition with NFC to enable a user to enter and use web addresses on portable devices.

BRIEF DESCRIPTION OF THE DRAWINGS

The accompanying drawings, which are incorporated herein and form part of the specification, illustrate embodiments of the present invention and, together with the description, further serve to explain the principles of the invention and to enable a person skilled in the pertinent art(s) to make and use the invention. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

While the present invention is described herein with reference to illustrative embodiments for particular applications, it should be understood that the invention is not limited thereto. Those skilled in the relevant art(s) with access to the teachings provided herein will recognize additional modifications, applications, and embodiments within the scope thereof and additional fields in which embodiments of the present invention would be of significant utility.

Reference in the specification to "one embodiment", "an embodiment" or "another embodiment" of the present invention means that a particular feature, structure or characteristic described in connection with the embodiment is included in at least one embodiment of the present invention. Thus, the appearances of the phrase "in one embodiment" or "in an embodiment" appearing in various places throughout the specification are not necessarily all referring to the same embodiment.

Embodiments of the present invention enable a portable device to process URIs (Universal Resource Identifiers), as well as the web content to which the URI (Universal Resource Identifier) refers to, in an efficient manner using NFC and voice recognition technology. This is accomplished using a portable (i.e, mobile) device that includes a NFC reader, an audio input interface, and a voice recognition system. The NFC reader may be used to read URIs from "Smart Posters" and other objects in which NFC tags are located. The audio input interface may be used to further annotate the URIs retrieved by the NFC reader with user-defined keywords for managing stored URIs. The audio input interface may also be used in conjunction with the voice recognition system as a voice assisted lookup mechanism for retrieving stored URIs.

Embodiments of the present invention provide a flexible framework for combining voice recognition with NFC. This enables devices with limited user interface (UI) capabilities to more easily navigate and use Internet content. Embodiments of the present invention also extend a portable device's command vocabulary through meta-data associated with the URIs obtained via the NFC reader.

Figure 1:
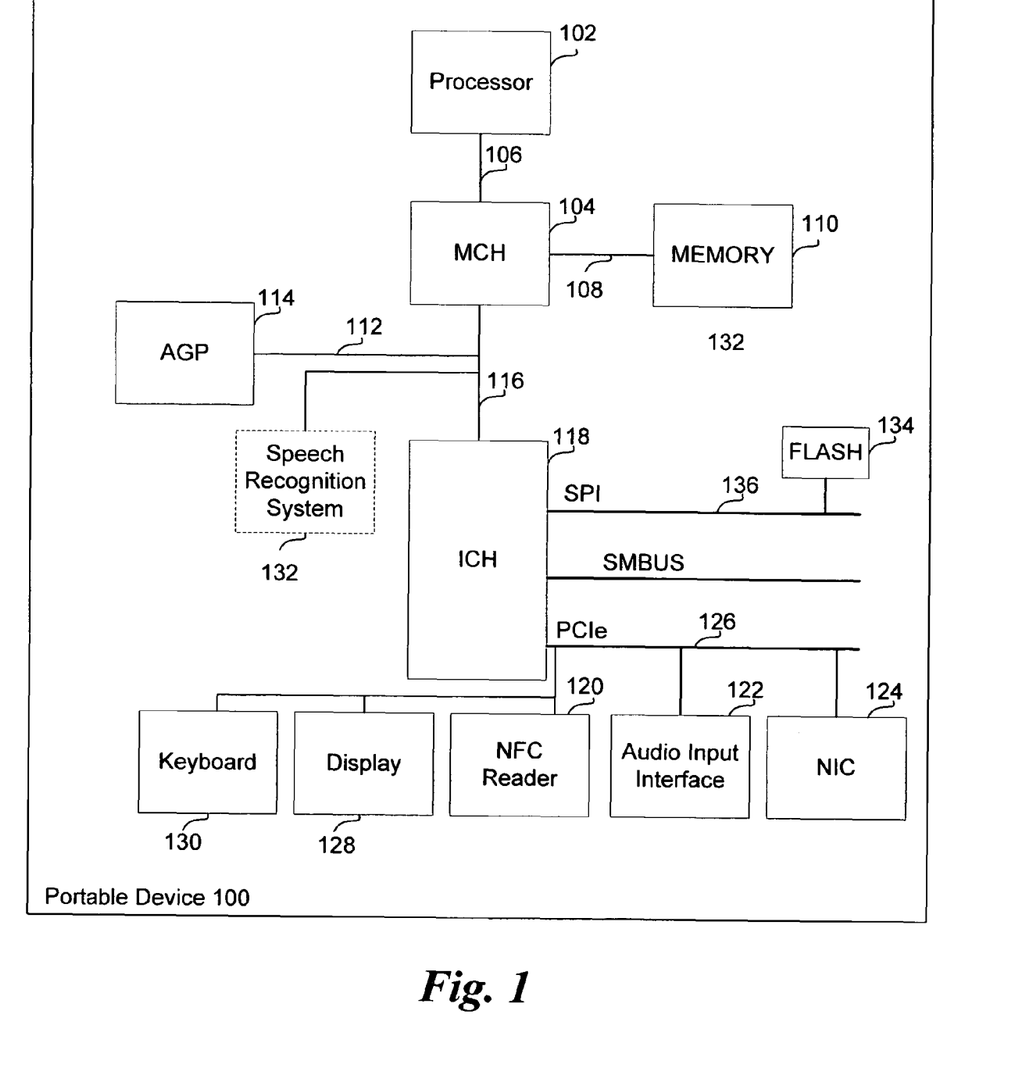
FIG. 1 is a block diagram illustrating an exemplary platform topology of a portable device according to an embodiment of the present invention.

Embodiments of the present invention may be implemented using hardware, software, or a combination thereof and may be implemented in one or more multi-core processor platforms or single-core processing systems. FIG. 1 illustrates an exemplary platform topology of a portable device 100 according to an embodiment of the present invention. Various embodiments are described in terms of this exemplary platform topology. After reading this description, it will be apparent to a person skilled in the relevant art(s) how to implement the invention using other platform topologies and/or other computer architectures.

Portable device 100 comprises a processor 102. As previously indicated, processor 102 may be a single core, a dual core, a quad core, or a multi-core processor. Processor 102 may be an Intel® Pentium® M processor manufactured by Intel® Corporation, located in Santa Clara, Calif., or any other type of processors capable of carrying out the methods disclosed herein, such as, for example, an Intel® Core™ Solo processor, an Intel® Core™ Duo processor, etc., each manufactured by Intel® Corporation. Processor 102 may include multiple threads as well.

Processor 102 may communicate with a memory controller hub (MCH) 104, also known as a North bridge, via a front side bus 106. MCH 104 communicates with system memory 110 via a memory bus 108. Memory 110 may be a hard disk, a floppy disk, random access memory (RAM), read only memory (ROM), flash memory, or any other type of medium readable by processor 102. Memory 110 may store instructions for performing the execution of method embodiments of the present invention. Memory 110 may also store each URI and its associated data that is captured using portable device 100. MCH 104 may also communicate with an advanced graphics port (AGP) 114 via a graphics bus 112.

MCH 104 may communicate with an I/O controller hub (ICH) 118, also known as a South bridge, via a peripheral component interconnect (PCI) bus 116. ICH 118 may be coupled to one or more I/O (Input/Output) component devices, such as, but not limited to, a NFC reader 120, an audio input interface 122, a network interface controller (NIC) 124 via a PCI bus 126, a display 128 for displaying web content as well as other information, and a keyboard 130. In many instances keyboard 130 may be a limited user interface (UI). Other types of I/O components may also be used as well.

NFC reader 120 of portable device 100 may be used for URI input. For example, NFC reader 120 may be used to obtain information about an object, event, advertisement, etc. from, for example, a Smart Poster or any other object having information attached onto a NFC tag. When a user touches the NFC tag with NFC reader 120 of portable device 100, information, such as, for example, a URI, may be read by NFC reader 120. In one embodiment, keywords specific to the content of the object, for example, the Smart Poster, in which the URI is obtained, may also be read by NFC reader 120 and used as default keywords when storing and retrieving the URI. In an embodiment in which portable device 100 has wireless Internet capabilities, when NFC reader 120 of portable device 100 touches an NFC tag from a Smart Poster or other object having information attached onto the NFC tag, a web browser window may open on display 128 and portable device 100 may connect to the Internet to download the data associated with the URI read by NFC reader 120.

Audio input interface 122 may be used for classification and retrieval purposes. For example, after a URI is read by portable device 100 via NFC 120, the user may augment the default keywords that are obtained from the NFC tag through audio input interface 122 by inputting user-defined keywords via audio input interface 122.

Portable device 100 further comprises a speech recognition system 132 (shown in phantom). Speech recognition system 132 may be implemented in hardware, software, or a combination thereof. If speech recognition system 132 is implemented in hardware, speech recognition system 132 may be coupled to MCH 104 via PCI bus 116. If speech recognition system 132 is implemented in software, speech recognition system 132 may be found in memory 110 (not shown). Speech recognition system 132 may be used to search and retrieve URIs based on voice input received from audio input interface 122. Speech recognition accuracy and efficiency improves dramatically when applied to limited-vocabulary domains. In one embodiment of the present invention, speech recognition system 132 may use limited vocabulary domains such as command-driven menus and keyword-based lookup.

Nonvolatile memory, such as a Flash memory 134, may be coupled to ICH 118 via a SPI (System Parallel Interface) bus 136. In embodiments of the present invention, BIOS firmware may reside in Flash memory 134 and at boot up of the platform, instructions stored on Flash memory 134 may be executed. In an embodiment, Flash memory 134 may also store instructions for performing the execution of method embodiments described herein. In one embodiment, speech recognition system 132 may be implemented in software stored in Flash memory 134. In this instance, speech recognition system 132 may be initialized during system boot up of the platform when portable device 100 is turned on.

As previously indicated, embodiments of the present invention perform the complex and error-prone task of URI input on a portable device using a NFC interface combined with an audio interface and a speech recognition system. Rather than having a user enter the entire URI via voice, the user may enter the URI via NFC and optionally enter user-defined keywords via the voice input interface that may be used to retrieve and manipulate data associated with the URI.

Figure 2:
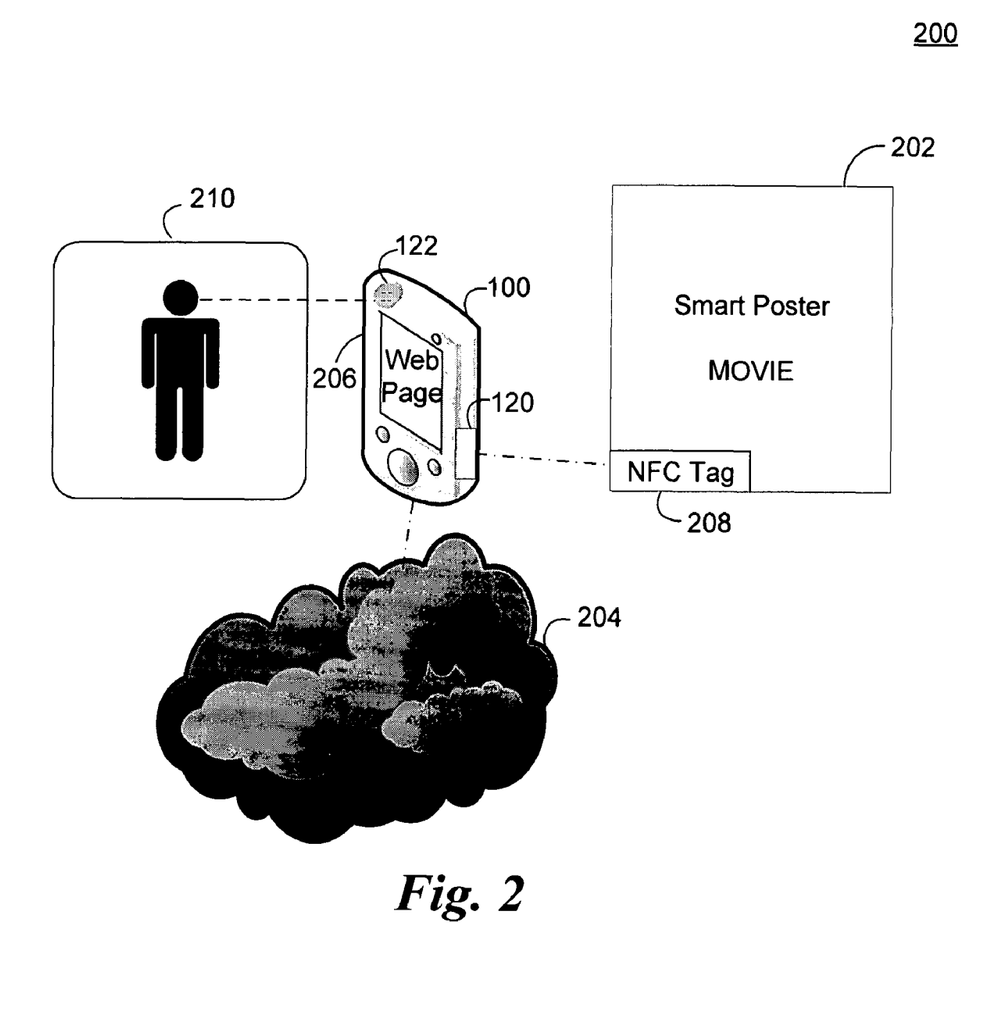
FIG. 2 is a block diagram illustrating an exemplary system for combining speech recognition and NFC to enable a user to enter and use web addresses on portable devices according to an embodiment of the present invention.

FIG. 2 is a block diagram illustrating an exemplary system 200 for combining speech recognition and NFC to enable a user to enter and use web addresses on portable devices according to an embodiment of the present invention. System 200 comprises portable device 100, a Smart Poster 202 of a movie presently be shown at the theatre, a network, such as, for example, Internet 204, and a Web page 206. Smart Poster 202 includes a NFC tag 208 containing a URI associated with advertised movie. As indicated above, portable device 100 includes NFC reader 120, audio input interface 122, and speech recognition system 132 (not explicitly shown).

A user 210, interested in attending the advertised movie on Smart Poster 202, enables NFC reader 120 of portable device 100 to touch NFC tag 208 to read the URI and associated default keywords into portable device 100. Associated keywords read by NFC reader 120 may be the title of the movie, local theatres and times of where and when the movie is playing, and other information about the movie. The time, date, and location of when and where the URI is captured may also be used as an annotation for the URI.

The URIs may be stored using default keywords and, if desired by the user, user-defined keywords entered by the user via the voice input interface. Once the URI is read, user 210 may verbally annotate the URI with user-defined keywords. In this example, user 210 verbally annotates the URI by saying the keyword "JoeActor" into audio input interface 122. "JoeActor" is user 210's favorite actor in the advertised movie, and therefore, will be easy for user 210 to remember when attempting to retrieve the URI at a later time.

If portable device 100 includes wireless Internet connectivity, portable device 100 may load Web page 206 associated with the URI read by NFC reader 120. In addition to the primary content on Web page 206, Web page 206 may contain meta-data encoded as an embedded XML (eXtensible Markup Language) data island. The meta-data may be used to facilitate subsequent search and selection by the user. For example, the meta-data can include a set of content links optimized to different device form factors, a small graphical icon, and a set of keywords (for lookup) that may be verbally entered using audio input interface 122.

The meta-data may also include additional voice commands tied to additional related links. These commands can help accelerate navigation of the target website. For example, if the URI includes a nearby restaurant to a theatre in which the movie is playing, voice command meta-data can point to internal links to provide a display of the menu from the nearby restaurant (that is, <Command word="menu"; link=http:// www?Restaurant?com/menu/>) or directions to the restaurant (that is, <Command word="restaurantdirections"; link=http://www?Restaurant?com/map/>). The URI may also include a command for directions to the theatre (that is, <Command word="theatredirections"; link=http://www?Theatre?com/map/>). (It should be noted that periods have been replaced with question marks in the above referenced URIs to avoid inadvertent hyperlinks.) Voice recognition system 132 in portable device 100 may be temporarily augmented with such extended commands when the user selects a URI.

With embodiments of the present invention, it is not mandatory that the web content associated with the URIs captured by NFC interface 120 be viewed immediately. Simple command-oriented voice recognition processing allows the stored URIs to be retrieved and manipulated. The voice recognition system and audio input interface of the portable device together form a speech-based interface that allows the user to perform URI lookup using the default and user-defined keywords.

Figure 3:
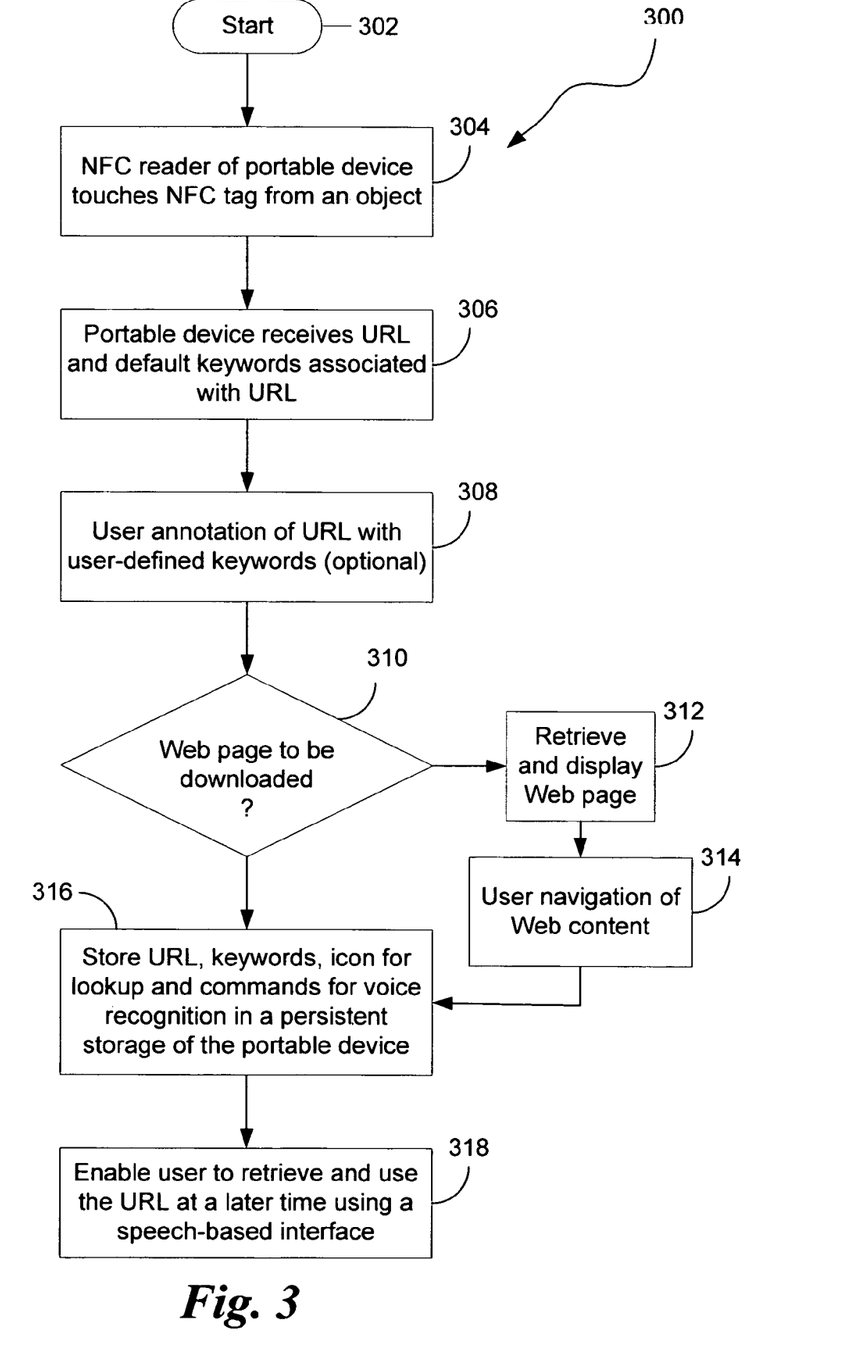
FIG. 3 is a flow diagram describing an exemplary method for enabling portable devices to navigate and use Internet content according to an embodiment of the present invention.

FIG. 3 is a flow diagram 300 describing an exemplary method for enabling portable devices to navigate and use Internet content according to an embodiment of the present invention. The invention is not limited to the embodiment described herein with respect to flow diagram 300. Rather, it will be apparent to persons skilled in the relevant art(s) after reading the teachings provided herein that other functional flow diagrams are within the scope of the invention. The process begins at block 302, where the process immediately proceeds to block 304.

In block 304, a NFC reader of a portable device touches a NFC tag found on an object, such as, for example, a Smart Poster. The process then proceeds to block 306.

In block 306, the portable device receives a URI and default keywords associated with the URI via the NFC reader. The process then proceeds to block 308.

In block 308, a user of the portable device may optionally annotate the URI with user-defined keywords via a voice input interface on the portable device. The process then proceeds to decision block 310.

In decision block 310, it is determined whether a Web page associated with the URI is to be downloaded and displayed on the portable device immediately. If the portable device is configured and able to connect with a server storing the Web page associated with the URI over the Internet, and the user desires to view the Web page at that time, then the portable device may retrieve and display the Web page at block 312. The process then proceeds to block 314, where the user may navigate and use the Internet content as described above with reference to FIG. 2 above. The user may also surf the Internet in a manner well known to those skilled in the relevant art(s). The process then proceeds to block 316.

Returning to decision block 310, if it is determined that the Web page associated with the URI is not to be downloaded and displayed immediately on the portable device, the process then proceeds to block 316.

In block 316, the portable device stores the URI, keywords, an icon for lookup, and commands for voice recognition in a persistent storage of the portable device. The process then proceeds to block 316.

In block 318, the user may retrieve and use the URI at a later time using the speech-based interface.

Figure 4:
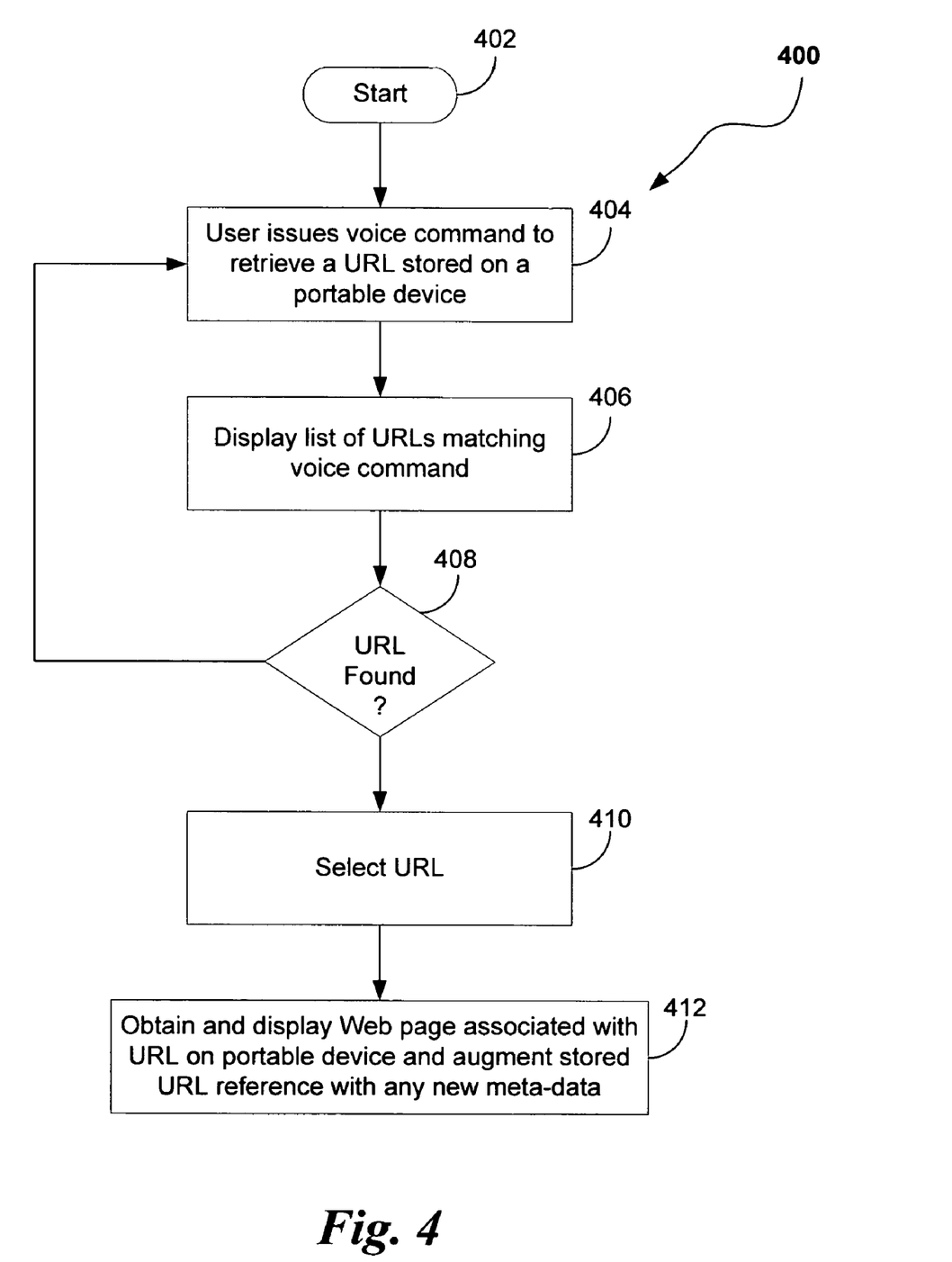
FIG. 4 is a flow diagram describing an exemplary method for retrieving and using URIs stored on a portable device via a voice input interface according to an embodiment of the present invention.

FIG. 4 is a flow diagram 400 describing an exemplary method for retrieving and using URIs stored on a portable device via a voice input interface according to an embodiment of the present invention. The invention is not limited to the embodiment described herein with respect to flow diagram 400. Rather, it will be apparent to persons skilled in the relevant art(s) after reading the teachings provided herein that other functional flow diagrams are within the scope of the invention. The process begins at block 402, where the process immediately proceeds to block 404.

In block 404, a user may issue a voice command to retrieve a URI stored in a persistent store of a portable device. For example, the user may issue the voice command "JoeActor" to retrieve all URIs related to Joe Actor that are stored on the portable device. The process then proceeds to block 406.

In block 406, representations of URIs matching the keyword "JoeActor" are displayed to the user. For example, a graphical icon and a short title for each URI matching the keyword "JoeActor" may be displayed. Other information associated with the URIs when they were originally acquired, such as keywords, time/date/location, etc. may also be displayed to aid the user in selecting the desired URI. The process then proceeds to decision block 408.

In decision block 408, it is determined whether the user has found the URI of interest to the user. If the user has found the URI of interest to the user, the process proceeds to block 410.

In block 410, the user may select the URI of interest to the user to be displayed. The process then proceeds to block 412.

In block 412, the portable device connects to the Internet and loads the web content corresponding to the URI. If the web content contains new meta-data, the portable device may augment the stored URI reference with the new meta-data.

Returning to decision block 408, if it is determined that the user has not found the URI of interest to the user, the process proceeds back to block 404, where the user may issue a voice command using a different keyword.

In an embodiment where the keyword results in only one match, the portable device may directly connect to the Internet and load the web content corresponding to that URI.

Most NFC readers can emulate NFC tags to be read by other NFC readers. Thus, when a user enables its portable device to be automatically loaded with a URI from an NFC tag on an object, that portable device may also transfer the URI to other portable devices having an NFC reader. For example, a public kiosk in an airport may include a voice recognition interface coupled with a pre-loaded database of URIs of local hotels, transportation, restaurants, and other services. A user may speak the desired service name using the voice input of the kiosk to look up matching services. Once a service is selected by the user, the kiosk can load the URI of that service into its NFC reader. The user can then touch the NFC reader of their portable device to the NFC reader of the kiosk to read the data into their portable device. In this way, associated and up-to-date contact information such as, for example, phone numbers, web sites, directions, etc., can be easily loaded by the portable device via its Internet connection.

Figure 5:
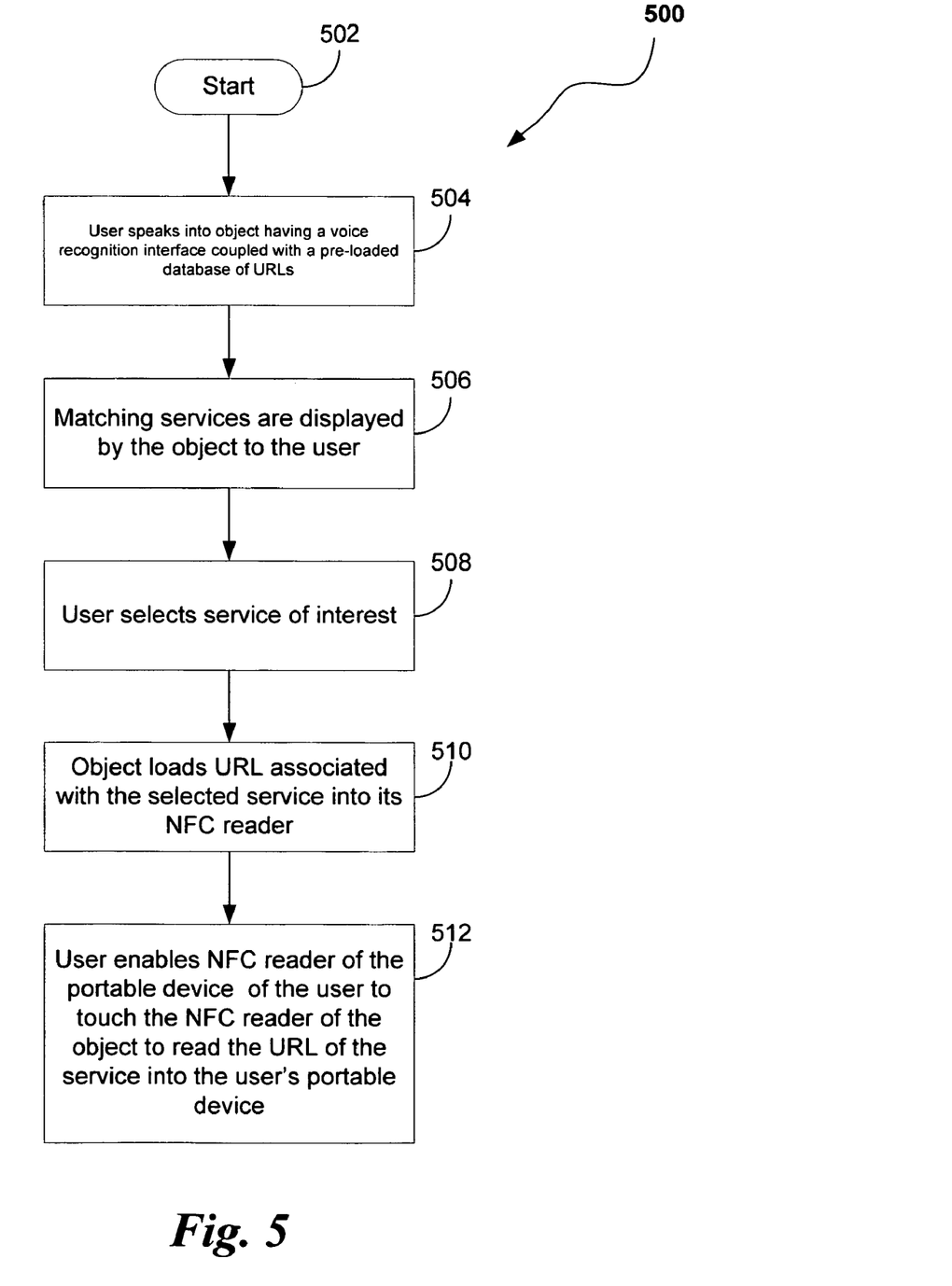
FIG. 5 is a flow diagram 500 illustrating an exemplary method for transferring information from one NFC reader to another NFC reader according to an embodiment of the present invention.

FIG. 5 is a flow diagram 500 illustrating an exemplary method for transferring information from one NFC reader to another NFC reader according to an embodiment of the present invention. The invention is not limited to the embodiment described herein with respect to flow diagram 500. Rather, it will be apparent to persons skilled in the relevant art(s) after reading the teachings provided herein that other functional flow diagrams are within the scope of the invention. The process begins at block 502, where the process immediately proceeds to block 504.

In block 504, a user speaks into an object having a voice recognition interface coupled with a pre-loaded database of URIs. The keyword spoken by the user is one of a plurality of desired services that the object has information about that may be retrieved by the user. The process proceeds to block 506.

In block 506, matching services are displayed by the object to the user. The process then proceeds to block 508.

In block 508, the user may select the service of interest to the user. The process then proceeds to block 510.

In block 510, the object may load the URI of that service into its NFC reader. The process then proceeds to block 512.

In block 512, the user may then enable the NFC reader of the portable device of the user to touch the NFC reader of the object to read the URI of the service into the portable device of the user.

Embodiments of the present invention may be implemented using hardware, software, or a combination thereof and may be implemented in one or more portable computer systems, as shown in FIG. 1, or other processing systems. The techniques described herein may find applicability in any computing, consumer electronics, or processing environment. The techniques may be implemented in programs executing on programmable machines such as mobile or stationary computers, personal digital assistants, set top boxes, cellular telephones and pagers, consumer electronics devices (including DVD (Digital Video Disc) players, personal video recorders, personal video players, satellite receivers, stereo receivers, cable TV receivers), and other electronic devices that may include at least one processor, a storage medium accessible by the processor (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that the invention can be practiced with various system configurations, including multiprocessor systems, minicomputers, mainframe computers, independent consumer electronics devices, and the like. The invention can also be practiced in distributed computing environments where tasks or portions thereof may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include a machine accessible medium having stored thereon instructions that may be used to program a processing system or other electronic device to perform the methods. The term "machine accessible medium" used herein shall include any medium that is capable of storing or encoding a sequence of instructions for execution by the machine and that cause the machine to perform any one of the methods described herein. The term "machine accessible medium" shall accordingly include, but not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system to cause the processor to perform an action or produce a result.

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined in accordance with the following claims and their equivalents.

What is claimed is:

1. A portable device for processing Web content comprising:
   a processor coupled to a Near Fields Communications (NFC) reader, an audio input interface, a speech recognition system, and memory; wherein:
   the NFC reader to:
      (i) read a Uniform Resource Identifier (URI) from an NFC tag attached to an object, and
      (ii) read keywords specific to content of the object from the NFC tag attached to the object, wherein the keywords are previously stored on the NFC tag attached to the object;
   the memory to store the URI and the keywords read by the NFC reader in a relationship to each other such that the stored keywords directly correspond to the stored URI;
   the audio input interface in conjunction with the speech recognition system to be used as a voice assisted lookup mechanism to enable a user of the portable device to verbally request retrieval of the stored URI from memory by speaking one or more of the keywords previously read by the NFC reader and stored in the memory;
   the speech recognition system to retrieve the verbally requested URI from the memory as a function of matching the one or more keywords spoken by the user with the directly corresponding URI stored in the memory; and
   the portable device to:
      (i) access a server over a network to retrieve and display Web content associated with the URI retrieved from the memory,
      (ii) obtain meta-data embedded within the Web content retrieved from the server, and
      (iii) augment the URI stored in the memory with the meta-data obtained from the Web content to facilitate subsequent search and retrieval of the stored URI by the user.

2. The portable device of claim 1, wherein the audio input interface and the speech recognition system enable the user of the portable device to annotate the URI with user-defined keywords, the user-defined keywords enable the user to verbally request retrieval of the URI from the memory.

3. The portable device of claim 1, further comprising a display to display the Web content associated with the URI.

4. The portable device of claim 1, wherein the meta-data comprises a plurality of Web content links, each Web content link configured for a different portable device form factor.

5. A system for processing Web content comprising:
a mobile device having a Near Field Communications (NFC) reader and an audio input interface as Input/Output devices, a speech recognition system, and memory;
an object having an NFC tag attached thereto, the NFC tag comprises:
   (i) at least one Uniform Resource Identifier (URI) previously stored thereon, and
   (ii) default keywords specific to content of the object, wherein the default keywords are also previously stored on the NFC tag attached to the object;
wherein when the NFC reader of the mobile device and the NFC tag touch:
   (i) the at least one URI stored on the NFC tag is transmitted to the mobile device,
   (ii) the default keywords stored on the NFC tag are transmitted to the mobile device, and
   (iii) wherein the at least one URI and the default keywords transmitted to the mobile device are stored in the memory of the mobile device in relationship to each other such that the stored default keywords directly correspond to the stored at least one URI; and
wherein when a user desires to retrieve the stored at least one URI from memory and view a Web page associated with the stored at least one URI, the user to speak at least one of the stored default keywords into the audio input interface of the mobile device to verbally request retrieval of the stored at least one URI, wherein upon hearing the at least one of the stored default keywords, the speech recognition system to:
   (i) retrieve the verbally requested URI as a function of matching the at least one of the stored default keywords spoken by the user with the directly corresponding URI stored in the memory,
   (ii) enable the mobile device to connect with a server via a network to retrieve and display the Web page associated with the URI stored in the memory,
   (iii) enable the mobile device to obtain meta-data embedded within the Web page retrieved from the server, and
   (iv) enable the mobile device to augment the URI stored in the memory with the meta-data obtained from the Web page to facilitate subsequent search and retrieval of the stored URI by the user.

6. The system of claim 5, wherein subsequent to the at least one URI and the default keywords transmitted to the mobile device being stored in the memory of the mobile device in relationship to each other, the user to enter user-defined keywords via the audio input interface, the user-defined keywords to also directly correspond to the at least one URI stored in the memory.

7. The system of claim 5, wherein the displayed Web page comprising voice commands tied to additional related links to accelerate navigation of the Web page.

8. A method for navigating and using Internet content comprising:
enabling a Near Field Communications (NFC) reader of a portable device to touch a NFC tag attached to an object of interest to a user of the portable device; wherein the NFC tag comprises:
   (i) a Uniform Resource Identifier (URI) previously stored thereon, and
   (ii) default keywords specific to content of the object, wherein the default keywords are also previously stored on the NFC tag attached to the object;
wherein when the NFC reader and the NFC tag touch, the portable device:
   (i) receiving, with the NFC reader, the URI and the default keywords stored on the NFC tag attached to the object,
   (ii) storing the URI and the default keywords received from the NFC tag in a persistent storage of the portable device in relationship to each other such that the stored default keywords directly correspond to the stored URI, and
   (iii) storing a date, time, and location of when and where the received URI was obtained;
enabling the user to retrieve and use the stored URI at a later time using a speech-based interface, wherein the user speaks the default keywords received by the NFC reader and stored in the persistent storage of the portable device to enable the speech-based interface to retrieve the stored URI from the persistent storage;
accessing a server over a network to retrieve and display Web content associated with the URI retrieved from the persistent storage;
obtaining meta-data embedded within the Web content retrieved from the server; and
augmenting the URI stored in the persistent storage with the meta-data obtained from the Web content to facilitate subsequent search and retrieval of the stored URI by the user.

9. The method of claim 8, wherein enabling the user to retrieve and use the URI at a later time using the speech-based interface comprises:
enabling the user to issue a voice command using the speech-based interface to retrieve the stored URI from the persistent storage, the voice command being at least one of the default keywords received by the NFC reader and stored in the persistent storage of the portable device, wherein when the voice command is received by the speech-based interface, the speech-based interface to use the voice command to retrieve a list of URIs stored in the persistent storage that directly correspond to the at least one default keyword of the voice command;
enabling the list of URIs stored in the persistent storage to be displayed on the portable device; and
enabling the user to select a URI of the user's choice from the list of URIs stored in the persistent storage.

10. The method of claim 9, wherein if the user is unable to select a URI of the user's choice, enabling the user to provide a new voice command, the new voice command being of a different default keyword received by the NFC reader and stored in the persistent storage of the portable device to enable a search for the URI of the user's choice.

11. The method of claim 9, wherein the meta-data is used to facilitate subsequent search and selection of the selected URI by the user.

12. The method of claim 9, wherein the meta-data comprises one or more voice commands, the voice commands are tied to additional related Web links to accelerate navigation of the Web content.

13. The method of claim 9, wherein the meta-data is encoded as an embedded XML (eXtensible Markup Language) data island.

14. The method of claim 8, wherein subsequent to storing the URI and the default keywords received by the NFC reader in the persistent storage in relationship to each other, enabling the user to enter user-defined keywords based on the content of the object of interest, the user-defined keywords to also directly correspond to the URI stored in the persistent storage.

15. An article comprising: a storage medium having a plurality of machine accessible instructions, wherein when the instructions are executed by a processor, the instructions provide for:
    enabling a Near Field Communications (NFC) reader of a portable device to touch a NFC tag attached to an object of interest to a user of the portable device; wherein the NFC tag comprises:
        (i) a Uniform Resource Identifier (URI) previously stored thereon, and
        (ii) default keywords specific to content of the object, wherein the default keywords are also previously stored on the NFC tag attached to the object;
    wherein when the NFC reader and the NFC tag touch, the portable device:
        (i) receiving, with the NFC reader, the URI and the default keywords stored on the NFC tag attached to the object,
        (ii) storing the URI and the default keywords received from the NFC tag in a persistent storage of the portable device in relationship to each other such that the stored default keywords directly correspond to the stored URI, and
        (iii) storing a date, time, and location of when and where the received URI was obtained;
    enabling the user to retrieve and use the stored URI at a later time using a speech-based interface, wherein the user speaks the default keywords received by the NFC reader and stored in the persistent storage to enable the speech-based interface to retrieve the stored URI from the persistent storage;
    accessing a server over a network to retrieve and display Web content associated with the URI retrieved from the persistent storage;
    obtaining meta-data embedded within the Web content retrieved from the server; and
    augmenting the URI stored in the persistent storage with the meta-data obtained from the Web content to facilitate subsequent search and retrieval of the stored URI by the user.

16. The article of claim 15, wherein instructions for enabling the user to retrieve and use the URI at a later time using the speech-based interface comprises instructions for:
    enabling a user to issue a voice command using the speech-based interface to retrieve the stored URI from the persistent storage, the voice command being at least one of the default keywords received by the NFC reader and stored in the persistent storage of the portable device, wherein when the voice command is received by the speech-based interface, the speech-based interface to use the voice command to retrieve a list of URIs stored in the persistent storage that directly correspond to the at least one default keyword of the voice command;
    enabling the list of URIs stored in the persistent storage to be displayed on the portable device; and
    enabling the user to select a URI of the user's choice from the list of URIs stored in the persistent storage.

17. The article of claim 16, wherein if the user is unable to select a URI of the user's choice, providing instructions for enabling the user to provide a new voice command, the new voice command being of a different default keyword received by the NFC reader and stored in the persistent storage of the portable device to enable a search for the URI of the user's choice.

18. The article of claim 16, wherein the meta-data is used to facilitate subsequent search and selection of the selected URI by the user.

19. The article of claim 16, wherein the meta-data includes one or more voice commands, the voice commands tied to additional related Web links to accelerate navigation of the Web content.

20. The article of claim 16, wherein the meta-data is encoded as an embedded XML (eXtensible Markup Language) data island.

21. The article of claim 15, wherein subsequent to instructions for storing the URI and the default keywords received by the NFC reader in the persistent storage in relationship to each other, providing instructions for enabling the user to enter user-defined keywords based on the content of the object of interest, the user-defined keywords to also directly correspond to the URI stored in the persistent storage.

\* \* \* \* \*